United States Patent Office 3,639,410
Patented Feb. 1, 1972

3,639,410
1,2,3,4,5,6 - HEXAHYDRO - 8 - SUBSTITUTED-6-ALKYL-11-(H OR ALKYL) - 2,6-METHANO-3-BENZAZOCINES

Noel F. Albertson and David Rosi, East Greenbush, N.Y., and Armando J. Merola, Township of Liberty, Delaware County, Ohio, assignors to Sterling Drug Inc., New York, N.Y.
No Drawing. Filed July 26, 1968, Ser. No. 747,848
Int. Cl. C07d 39/00
U.S. Cl. 260—293.54
17 Claims

ABSTRACT OF THE DISCLOSURE 1,2,3,4,5,6 - hexahydro - 3 - ($Y^1$) - 8 - ($Y^2$) - 6 - ($R^1$)-11-($R^2$)-2,6-methano-3-benzazocines wherein $Y^1$ is (1,3-dioxacycloalkyl)alkyl, gem-dialkoxyalkyl, alkanoylalkyl, or (carboxy-, esterified carboxy, or hydroxy)-(alkyl or alkenyl), which are useful as antagonists of strong analgesics, are obtained by alkylation and various other reactions from the corresponding 3-(H) compounds.

This invention relates to compositions of matter classified in the art of chemistry as 1,2,3,4,5,6-hexahydro-2,6-methano-3-benzazocines and to processes for their preparation.

The invention sought to be patented resides in its composition aspect in the concept of novel chemical compounds designated as 1,2,3,4,5,6-hexahydro-3-($Y^1$)-8-($Y^2$) - 6 - ($R^1$) - 11 - ($R^2$) - 2,6 - methano - 3 - benzazocines having in the free base form the formula

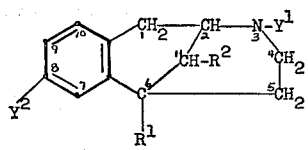

Formula I wherein $R^1$ is alkyl containing 1–4 carbon atoms; $R^2$ is hydrogen or alkyl containing 1–4 carbon atoms; $Y^1$ is (1,3-dioxacycloalkyl)alkyl containing 4–8 carbon atoms of which 3–4 carbon atoms are in the ring, gem-dialkoxyalkyl containing 4–8 carbon atoms, alkanoylalkyl containing 3–8 carbon atoms, RO—CO—Z— wherein R is hydrogen, alkyl containing 1–6 carbon atoms, or benzyl and Z is alkylene containing 1–5 carbon atoms, RO—CO-alkenylene-CH($R^3$)— wherein alkenylene contains 2–5 carbon atoms, R has the same significance indicated above and $R^3$ is hydrogen, methyl, or ethyl, HO-alkylene- containing 2–6 carbon atoms, or HOCH₂-alkenylene-CH($R^3$)— wherein alkenylene contains 2–5 carbon atoms and $R^3$ has the same significance indicated above; and $Y^2$ is halo, trifluoromethyl, hydroxy, alkoxy containing 1–4 carbon atoms, methoxymethoxy, trihalomethoxy, alkanoyloxy containing 1–12 carbon atoms, cycloalkanecarbonyloxy containing 4–8 carbon atoms, pyridinecarbonyloxy, nitro, amino, alkanoylamino containing 1–12 carbon atoms, cycloalkanecarbonylamino, pyridinecarbonylamino, or alkanesulfonamido containing 1–12 carbon atoms.

The invention sought to be patented resides in one process aspect in the concept of the process which comprises interacting 1,2,3,4,5,6-hexahydro-8-($Y^2$)-6-($R^1$)-11-($R^2$)-2,6-methano-3-benzazocine having the formula

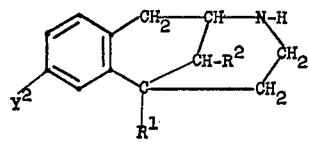

Formula II with an agent having the formula halogen-$Y^3$

Formula III in the presence of an acid-absorbing medium, wherein $R^1$, $R^2$, and $Y^2$ have the same significance indicated above in Formula I and $Y^3$ is (1,3-dioxacycloalkyl)alkyl containing 4–8 carbon atoms of which 3–4 carbon atoms are in the ring, gem-dialkoxyalkyl containing 2–8 carbon atoms, alkanoylalkyl containing 3–8 carbon atoms, $R^4$O—CO—Z— wherein $R^4$ is alkyl containing 1–6 carbon atoms or benzyl and Z is alkylene containing 1–5 carbon atoms, or $R^4$—O—CO-alkenylene-CH($R^3$)— wherein alkenylene contains 2–5 carbon atoms, $R^4$ has the same significance indicated hereinabove, and $R^3$ is hydrogen, methyl, or ethyl.

The invention sought to be patented resides in another process aspect in the concept of the process which comprises interacting 1,2,3,4,5,6-hexahydro-8-($Y^2$)-6-($R^1$)-11 - ($R^2$) - 2,6-methano-3-benzazocine with a vinyl ketone containing 3–8 carbon atoms and having the formula

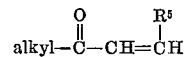

Formula IV to yield 1,2,3,4,5,6 - hexahydro - 3 - [alkyl-CO—CH₂—CH($R^5$)-]-8 - ($Y^2$) - 6 - ($R^1$) - 11 - ($R^2$)-2,6-methano-3-benzazocine, wherein $R^1$, $R^2$, and $Y^2$ have the same significance indicated above in Formula I and $R^5$ is hydrogen or alkyl.

The invention sought to be patented resides in a further process aspect in the concept of the process which comprises reducing 1,2,3,4,5,6-hexahydro-3-

(RO—CO—Z—)

8-($Y^4$)-6-($R^1$)-11-($R^2$)-2,6-methano-3 - benzazocine with lithium aluminum hydride to yield 1,2,3,4,5,6-hexahydro-3 - (HOCH₂—Z—) - 8 - ($Y^4$)-6-($R^1$)-11-($R^2$)-2,6-methano-3-benzazocine wherein R, $R^1$, $R^2$, and Z have the same significance indicated above in Formula I and $Y^4$ is halo, trifluoromethyl, hydroxy, alkoxy containing 1–4 carbon atoms, methoxymethoxy, trihalomethoxy, nitro or amino.

The invention sought to be patented resides in a still further process aspect in the concept of the process which comprises reducing 1,2,3,4,5,6 - hexahydro-3-[RO—CO-alkenylene - CH(R³)-]-8-(Y⁴)-6-(R¹)-11-(R²)-2,6-methano-3-benzazocine with lithium aluminum hydride to yield 1,2,3,4,5,6 - hexahydro - 3-(HOCH₂-alkenylene-CH(R³)-8-(Y⁴)-6-(R¹)-11-(R²) - 2,6 - methano - 3 - benzazocine, wherein R, R¹, R², R³, Y⁴, and alkenylene have the same significance indicated hereinabove.

When either or both of R¹ and R² are alkyl there are included for example methyl, ethyl, n-propyl, isopropyl, isobutyl, and the like.

When Y¹ or Y³ is (1,3-dioxacycloalkyl)alkyl, there are included for example

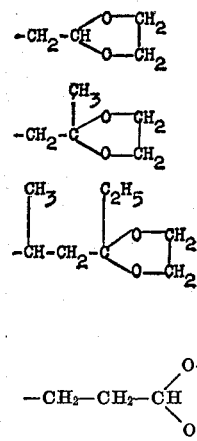
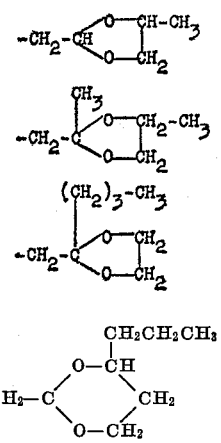
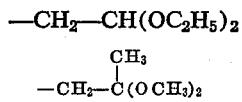

and the like.

When Y¹ or Y³ is gem-dialkoxyalkyl, there are included for example —CH₂—CH(OCH₃)₂,

—CH₂—CH(OC₂H₅)₂

$$-CH_2-\underset{CH_3}{\overset{CH_3}{C}}(OCH_3)_2$$

—CH₂—CH(OCH₂CH₂CH₃)₂, and the like.

When Y¹ or Y³ is alkanoylalkyl there are included for example —CH₂—CO—CH₃, —CH₂—CO—C₂H₅,

—CH₂CH₂—CO—CH₃, —CH₂—CO—CH(CH₃)₂

—CH₂—CO—(CH₂)₃—CH₃, —(CH₂)₈—CO—CH₃ and the like.

When Y¹ is RO—CO—Z, there are included for example HOOC—CH₂—, HOOC—CH(CH₃)—,

HOOC—(CH₂)₅—, CH₃—O—CO—CH₂—

C₂H₅O—CO—CH₂—, (CH₃)₂CHO—CO—CH(CH₃)—

(CH₃)₂CHO—CO—(CH₂)₂—

CH₃(CH₂)₂CH₂O—CO—(CH₂)₅—

CH₃(CH₂)₃CH₂O—CO—CH₂—

(CH₃)₂CH(CH₂)₂CH₂O—CO—CH₂—

C₆H₅CH₂O—CO—CH₂—

—CH(CH₃)—CO—CH₂C₆H₅, and the like.

When Y¹ is RO—CO-alkenylene-CH(H³)— there are included for example HOOC—CH=CH—CH₂—,

HOOC—C(CH₃)=CH—CH₂

HOOC—C(C₂H₅)=CH—CH₂—

HOOC—CH=C(CH₃)—CH(CH₃)—

CH₃O—CO—CH=CH—CH₂—

(CH₃)₂CHO—CO—CH=CH—CH₂—

C₆H₅CH₂O—CO—C(CH₃)=CH—CH₂—

CH₃(CH₂)₄CH₂O—CO—C(CH₃)=CH—CH₂— and the like.

When Y¹ is HO-alkylene-, there are included for example HO—CH₂CH₂—, HO—CH(CH₃)—CH₂—, (CH₃)₂C(OH)—CH₂CH₂—

(CH₃)₂CH—CH(OH)—CH₂—, and the like.

When Y¹ is HOCH₂-alkenylene-CH(R³)—, there are included for example HOCH₂—CH=CH—CH₂—,

HOCH₂—C(CH₃)=CH—CH₂—

HOCH₂—CH=C(CH₃)—CH₂—

HOCH₂—C(CH₃)=C(CH₃)—CH₂—

HOCH₂—CH=CH—CH(CH₃)—, and the like.

When Y² is halo there are included chlorine, bromine, fluorine, and iodine. When Y² is alkoxy there are included for example methoxy, ethoxy, propoxy, isopropoxy, t-butoxy, and the like. When Y² is trihalomethoxy there are included for example trichloromethoxy and trifluoromethoxy. When Y² is lower alkanoyloxy there are included for example formoxy, acetoxy, propionoxy, isovaleroxy, dodecanoyloxy, and the like. When Y² is cycloalkanecarbonyloxy there are included for example cyclopropanecarbonyloxy, cyclobutanecarbonyloxy, cyclohexanecarbonyloxy, 1-methylcyclohexanecarbonyloxy, and the like. When Y² is pyridinecarbonyloxy there are included 2-pyridinecarbonyloxy, 3-pyridinecarbonyloxy, and 4-pyridinecarbonyloxy. When Y² is alkanoylamino there are included for example formamido, acetamido, propionamido, isovaleramido, heptanoylamino, dodecanoylamino, and the like. When Y² is cycloalkanecarbonylamino there are included for example cyclopropanecarbonylamino, cyclobutanecarbonylamino, cyclohexanecarbonylamino, 1-methylcyclopentanecarbonylamino, and the like. When Y² is pyridinecarbonylamino there are included 2-pyridinecarbonylamino, 3-pyridinecarbonylamino, and 4-pyridinecarbonylamino. When Y² is lower alkanesulfonamido there are included for example methane-sulfonamido, ethane-sulfonamido, hexanesulfonamido, octanesulfonamido, undecane-sulfonamido, and the like.

Due to the presence of the basic amino grouping, the free base forms represented by Formula I above react with organic and inorganic acids to form acid-addition salts. The acid-addition salt forms are prepared from any organic or inorganic acid. They are obtained in conventional fashion, for instance either by direct mixing of the base with the acid or, when this is not appropriate, by dissolving either or both of the base and the acid separately in water or an organic solvent and mixing the two solutions, or by dissolving both the base and the acid together in a solvent. The resulting acid-addition salt is isolated by filtration, if it is insoluble in the reaction medium, or by evaporation of the reaction medium to leave the acid-addition salt as a residue. The acid moieties or anions in these salt forms are in themselves neither novel nor critical and therefore can be any acid anion or acid-like substance capable of salt formation with the base.

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, tannic acid, glutamic acid, tartaric acid, oxalic acid, pyromucic acid, citric acid, lactic acid, glycolic acid, gluconic acid, saccharic acid, ascorbic acid, penicillin, benzoic acid, phthalic acid, salicylic acid, 3,5-dinitrobenzoic acid, anthranilic acid, cholic acid, 2-pyridinecarboxylic acid, pamoic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, butylarsonic acid, methanephosphonic acid, acidic resins, hydrofluroic acid, hydrochloric acid, hydrobromic acid, hydriodic acid, perchloric acid, nitric acid, sulfuric acid, phosphoric acid, arsenic acid, and the like.

All of the acid-addition salts are useful as sources of the free base form, by reaction with an inorganic base. It will thus be appreciated that if one or more of the characteristics, such as solubility, molecular weight, physical appearance, toxicity, or the like of a given base or acid-addition salt thereof render that form unsuitable for the purpose at hand, it can be readily converted to another, more suitable form. For pharmaceutical purposes, acid-addition salts of relatively non-toxic, pharmaceutically-acceptable acids, for example hydrochloric acid, lactic acid, tartaric acid, and the like, are of course employed.

The 1,2,3,4,5,6-hexahydro-3-($Y^1$)-8-($Y^2$)-6-($R^1$) - 11-($R^2$)-2,6-methano-3-benzazocines of this invention can exist in stereochemically isomeric forms, that is, optical isomers and geometric isomers. If desired, the isolation or the production of a particular stereochemical form can be accomplished by application of the general principles known in the prior art.

The manner and process of making and using the invention, and the best mode contemplated by the inventors of carrying out this invention, will now be described so as to enable any person skilled in the art to which it pertains to make and use the same.

For the preparation of the 1,2,3,4,5,6 - hexahydro - 3-($Y^1$)-8-($Y^2$)-6-($R^1$)-11-($R^2$) - 2,6 - methano - 3 - benzazocines of Formula I hereinabove, there can be employed the following procedure. First, 1,2,3,4,5,6-hexahydro-8-($Y^2$)-6-($R^1$)-11-($R^2$)-2,6-methano-3-benzazocine is alkylated with an agent having the formula halogen-$Y^3$ (Formula III) wherein $R^1$, $R^2$, and $Y^2$ have the same significance indicated above in Formula I and $Y^3$ is (1,3-dioxacycloalkyl)alkyl containing 4–8 carbon atoms of which 3–4 carbon atoms are in the ring, gem-dialkoxyalkyl containing 2–8 carbon atoms, alkanoylalkyl containing 3–8 carbon atoms, $R^4O$—CO—Z— wherein $R^4$ is alkyl containing 1–6 carbon atoms or benzyl, and Z is alkylene containing 1–5 carbon atoms, or $R^4O$—CO-alkenylene-CH($R^3$)— wherein alkenylene contains 2–5 carbon atoms, and $R^3$ and $R^4$ have the same significance indicated hereinabove. The groups $R^4O$—CO—Z— and $R^4O$—CO-alkenylene-CH($R^3$)— correspond to the $Y^1$ groups RO—CO—Z— and RO—CO-alkenylene-CH($R^3$)— respectively, except for the omission of the corresponding acids, i.e. wherein R is hydrogen. This alkylation reaction is carried out in the presence of an acid-absorbing medium, for instance an alkali metal carbonate or hydroxide, preferably sodium or potassium carbonate or bicarbonate. The reaction is conveniently run by heating the reactants in a suitable organic solvent, for instance a lower alkanol or N,N-dimethylformamide.

As will of course be appreciated, the 1,2,3,4,5,6-hexahydro-3-($Y^3$)-8-($Y^2$)-6-($R^1$)-11-($R^2$) - 2,6 - methano-3-benzazocine products of the alkylation process of this invention do not represent all of the species of Formula I, in that $Y^3$ is of lesser scope than $Y^1$. These remaining compounds of Formula I, i.e. the compounds wherein $Y^1$ is not identical with $Y^3$, are readily obtained by one of the other processes of this invention indicated above or from the products of one or more of the several processes of this invention by the further steps hereinafter described.

The compounds of Formula I wherein $Y^1$ is alkanoylalkyl are prepared generally by the alkylation process above-described. Certain of these species wherein the oxo group is on the 3- or gamma-carbon atom are also obtained by the process which comprises interacting 1,2,3,4,5,6-hexahydro-8-($Y^2$)-6-($R^1$)-11-($R^2$)-2,6 - methano - 3-benzaocine with a vinyl ketone having the formula alkyl-CO—CH=CH($R^5$) (Formula IV) and containing 3–8 carbon atoms, wherein $R^1$, $R^2$, $R^5$, and $Y^2$ have the same significance indicated hereinabove. This addition reaction is conveniently carried out in the presence of a tertiary organic base, for instance pyridine.

The interconvertibility of certain of the products of Formula I permits preparing one spicies of Formula I from another, using chemical reactions well-known generally in the chemical art. Thus, the processes of this invention wherein lithium aluminum hydride is used to reduce 1,2,3,4,5,6 - hexahydro-3-(RO—CO—Z—)-8-($Y^4$)-6-($R^1$)-11-($R^2$)-2,6-methano-3-benzazocine or 1,2,3,4,5,6-hexahydro - 3 - [RO—CO-alkenylene-CH($R^3$)-[8-($Y^4$)-6-($R^1$)-11-($R_2$)-2,6-methano - 3 - benzazocine species of Formula I yield certain of the compounds of Formula I wherein $Y^1$ contains a primary alcoholic group and $Y^2$ does not include groups susceptible to lithium aluminum hydride reduction, namely 1,2,3,4,5,6 - hexahydro-3-(HOCH$_2$—Z—)-8-($Y^4$)-6-($R^1$) - 11 - ($R^2$)-2,6-methano-3 - benzazocine or 1,2,3,4,5,6 - hexahydro-3-[HOCH$_2$-alkenylene - CH($R^3$)-]-8-($Y^4$) - 6 - ($R^1$)-11-($R^2$)-2,6-methano-3-benzazocine, respectively, wherein R, $R^1$, $R^2$, $R^3$, Z, alkylene, and $Y^4$ have the same significance indicated hereinabove. This reduction is carried out in a suitable solvent, for instance tetrahydrofuran.

Other compounds of Formula I wherein $Y^1$ is HO-alkylene- are obtained by reduction of the compounds of Formula I wherein $Y^1$ is alkanoylalkyl. By reacting a lower alkylmagnesium iodide in a Grignard reaction with 1,2,3,4,5,6-hexahydro - 3 - alkanoylalkyl-8-($Y^4$)-6-($R^1$)-11-($R^2$)-2,6-methano-3-benzazocine species of Formula I there is otbained a 1,2,3,4,5,6 - hexahydro-3-(HO-alkylene) - 8 - ($Y^4$)-6-($R^1$)-11-($R^2$)-2,6-methano - 3 - benzazocine of Formula I wherein HO-alkylene- is a tertiary alkanol moiety, viz. (alkyl)$_2$C(OH)-; for instance, a 2-(3-oxoalkyl) group is converted to a 3-[3-hydroxy-3-(lower alkyl)alkyl] group.

The compounds of Formula I wherein $Y^1$ is

HOOC—Z— or HOOC-alkenylene-CH($R^3$)— are readily obtained by hydrolyzing in conventional fashion the corresponding alkyl or benzyl esters.

Conversion of one species of Formula I to another affords in many instances an alternative to use of the direct alkylation process. Thus, the compounds of Formula I wherein $Y^2$ is alkoxy can be obtained by etherification of the corresponding compounds of Formula I wherein $Y^2$ is hydroxy. Or, on the other hand, the species of Formula I wherein $Y^2$ is hydroxy can be obtained by cleaving the corresponding 8-alkoxy species with a suitable agent such as concentrated hydrobromic acid. Similarly, the species of Formula I wherein $Y^2$ is alkanoyloxy, cycloalkanecarbonyloxy, or pyridinecarbonyloxy can be prepared by esterifying the corresponding 8-hydroxy compounds of Formula I in conventional fashion for esterification of phenols, by treatement with a suitable O-alkanoylating or O-cycloalkanecarbonylating or O-pyridinecarbonylating agent, for instance the appropriate acid anhydride or acid chloride. Alternatively, if desired, the 8-acyloxy compounds of Formula I are readily hydrolyzed to the corresponding 8-hydroxy compounds. When $Y^1$ contains an ester grouping and it is desired to leave it intact, the hydrolysis is conducted under mild conditions so that only the 8-acyloxy group is hydrolyzed. We usually prefer to use an amine, for instance, N,N-diethylaminoethylamine, or ammonia in butyl alcohol for this differential hydrolysis.

The 8-(methoxymethoxy) compounds of Formula I can alternatively be obtained by interacting chloromethyl methyl ether with the sodio or other suitable metallo derivative of the corresponding 8-hydroxy compounds of Formula I.

The compounds of Formula I wherein $Y^2$ is trihalomethoxy are alternatively obtained by halogenating the corresponding 8-methoxy compounds of Formula I. If desired, the trifluoromethoxy compounds are produced from the trichloromethoxy compounds by halogen exchange in conventional fashion.

The compounds of Formula I wherein $Y^2$ is alkanoylamino, cycloalkanecarbonylamino, pyridinecarbonylamino, or alkanesulfonamido are alternatively obtained by N-alkanoylating, N-cycloalkanecarbonylating, N-pyridinecarbonylating, or N-alkanesulfonylating the corresponding 8-amino compounds of Formula I, which in turn are alternatively produced by reducing the corresponding 8-nitro compounds of Formula I with zinc or iron and an acid, for example acetic acid. For preparation of the acylamino compounds, direct reductive acylation of the nitro compounds is sometimes preferable.

The 1,2,3,4,5,6 - hexahydro-8-($Y^2$)-6-($R^1$)-11-($R^2$)-2,6-methano-3-benzazocines employed as starting materials in the preparation of the compounds of Formula I hereinabove are a known class of compounds, and all of the species of this class of nor-bases required for practice of the processes of the instant invention are either known or readily derived from the old spices by obvious and conventional chemical reactions. For instance, 1,2,3,4,5,6-hexahydro-3-methyl - 8 - nitro-6-($R^1$)-11-($R^2$)-2,6-methano-3-benzazocine is readily N-demethylated in known manner to yield 1,2,3,4,5,6-hexahydro-8-nitro-6-($R^1$)-11-($R^2$)-2,6-methano-3-benzazocine which by reduction with zinc and acetic acid yields 1,2,3,4,5,6-hexahydro-3-amino-8-amino-6-($R^1$)-11-($R^2$)-2,6-methano - 3 - benzazocine. If desired, this product is readily acylated, in the form of its monohydrochloride, with an appropriate N-alkylanoylating, N-cycloalkanecarbonylating, N - pyridinecarbonylating, or N-alkanesulfonylating agent; using this procedure, N-acylation at the 3-position is minimized and the chief acylation product is the corresponding 1,2,3,4,5,6-hexahydro- - 8 - acylamino-6-($R^1$)-11-($R^2$)-2,6-methano-3-benzazocine.

The 1,2,3,4,5,6 - hexahydro - 3-($Y^1$)-8-($Y^2$)-6-($R^1$-11-($R^2$)-2,6-methano-3-benzazocines of this invention can be administered parenterally or orally in any of the conventional pharmaceutical forms, as for instance solutions, suspensions, tablets, capsules, and the like.

The structures of the compounds of this invention were established by the modes of synthesis, by elementary analysis, and by ultraviolet, infrared, and nuclear magnetic resonance spectra. The course of the reactions and homogeneity of the products were ascertained by thin layer chromatography.

The invention is illustrated by the following examples without, however, being limited thereto. The melting points are uncorrected except where otherwise indicated.

EXAMPLE 1

(A) A mixture of 10.9 g. of 1,2,3,4,5,6-hexahydro-8-hydroxy-cis-6,11-dimethyl-2,6-methano-3-benzazocine, 15 g. of sodium bicarbonate, 1 g. of potassium iodide, 150 ml. of N,N-dimethylformamide and 6.3 g. of 2-chloromethyl-1,3-dioxolane was refluxed with stirring for eight hours. The reaction mixture was filtered and the filtrate was concentrated under reduced pressure. The resulting residue was partitioned between chloroform and water, and the chloroform layer was separated and dried. The chloroform solution was then concentrated under reduced pressure to yield 16 g. of a thick reddish oil. To this oil there was added 50 ml. of ethyl acetate and the resulting solution was chilled. A small amount of solid which had separated from solution was removed by filtration and the filtrate was concentrated under reduced pressure to yield 13 g. of semi-solid product. This product was chromatographed on a silicon dioxide column, eluting with a mixture of 94% chloroform, 3% methyl alcohol, and 3% isopropyl alcohol, by volume. Fractions of product obtained in this manner melting at 135–147° C. (1.2 g.), 125–138° C. (4.5 g.), and 120–137° C. (0.3 g.) were combined and recrystallized from ethyl acetate to yield 3.8 g. of 1,2,3,4,5,6 - hexahydro - 3 - (2,5-dioxacyclopentylmethyl)-8-hydroxy-cis-6,11-dimethyl-2,6-methano-3-benzazocine as off-white crystals which melted at 147–149.5° C.

(B) The 1,2,3,4,5,6 - hexahydro-3-(2,5-dioxacyclopentylmethyl) - 8 - hydroxy-cis-6,11-dimethyl-2,6-methano-3-benzazocine obtained in part A above is readily O-acylated by the following mixed anhydride procedure. The appropriate acid is mixed with one equivalent of isobutyl chloroformate in triethylamine and acetone at −10° C. and after ten minutes at this temperature adding one equivalent of 1,2,3,4,5,6 - hexahydro - 3-(2,5-dioxacylopentylmethyl )- 8- hydroxy-cis - 6,11-dimethyl-2,6-methano-3-benzazocine, thus producing the desired 8-acyloxy compound. For example when the acid is acetic acid, dodecanoic acid, cyclopropanecarboxylic acid, cyclohexanecarboxylic acid, or nicotinic acid, the O-acylation product is 1,2,3,4,5,6 - hexahydro-3-(2,5-dioxacyclopentylmethyl)-8 - acetoxy-cis-6,11-dimethyl-2,6-methano-3-benzazocine, 1,2,3,4,5,6 - hexahydro - 3-(2,5-dioxacyclopentylmethyl-8-dodecanoyloxy-cis - 6,11-dimethyl-2,6-methano-3-benzazocine, 1,2,3,4,5,6 - hexahydro - 3 - (2,5-dioxacyclopentylmethyl) - 8 - cyclopropanecarbonyloxy-cis-6,11-dimethyl-2,6 - methano - 3 - benzazocine, 1,2,3,4,5,6-hexahydro-3-(2,5 - dioxacyclopentylmethyl) - 8 - cyclohexanecarbonyloxy-cis - 6,11 - dimethyl-2,6-methano-3-benzazocine, or 1,2,3,4,5,6 - hexahydro-3-(2,5-dioxacyclopentylmethyl)-8-nicotinoyloxy-cis - 6,11-dimethyl-2,6-methano-3-benzazocine, respectively.

(C) Following a procedure similar to that described in part A above but using 1,2,3,4,5,6-hexahydro-8-trifluoromethoxy-cis - 6,11 - dimethyl-2,6-methano-3-benzazocine and 1,2,3,4,5,6 - hexahydro-8-trifluoromethyl-cis-6,11-dimethyl - 2,6-methano-3-benzazocine instead of the corresponding 8-hydroxy compound, there are obtained as the respective products 1,2,3,4,5,6 - hexahydro-3-(2,5-dioxacyclopentylmethyl) - 8 - trifluoromethoxy-cis-6,11-dimethyl - 2,6 - methano-3-benzazocine and 1,2,3,4,5,6-hexahydro - 3 - (2,5-dioxacyclopentylmethyl)-8-trifluoromethyl-cis-6,11-dimethyl-2,6-methano-3-benzazocine.

EXAMPLE 2

Following a procedure similar to that described above in Example 1A but using 1,2,3,4,5,6-hexahydro-8-chloro-cis-6,11-dimethyl-2,6-methano-3-benzazocine instead of 1, 2,3,4,5,6 - hexahydro - 8-hydroxy-cis-6,11-dimethyl-2,6-methano - 3 - benzazocine, there is obtained 1,2,3,4,5,6-hexahydro - 3 - (2,5 - dioxacyclopentylmethyl)-8-chloro-cis-6,11-dimethyl-2,6-methano-3-benzazocine.

EXAMPLE 3

Following a procedure similar to that described above in Example 1A but using 1,2,3,4,5,6-hexahydro-8-nitro-cis-6,11-dimethyl-2,6-methano-3-benzazocine instead of 1, 2,3,4,5,6 - hexahydro - 8 - hydroxy-cis-6,11-dimethyl-2,6-methano-3-benzazocine, there is obtained 1,2,3,4,5,6-hexahydro - 3 - (2,5-dioxacyclopentylmethyl)-8-nitro-cis-6,11-dimethyl-2,6-methano-3-benzazocine. Reduction of this product with zinc and acetic acid yields 1,2,3,4,5,6-hexahydro - 3 - (2,5 - dioxacyclopentylmethyl)-8-amino-cis-6,11-dimethyl-2,6-methano-3-benzazocine. N-acylation of this 8-amino compound in the presence of pyridine with propionyl chloride, with octanoyl chloride, with cyclopentanecarbonyl chloride, with 2-pyridinecarbonyl chloride, and with decanesulfonyl chloride yields the respective products 1,2,3,4,5,6 - hexahydro - 3 - (2,5-dioxacyclopentylmethyl) - 8 - propionylamino-cis-6,11-dimethyl-2,6-methano-3-benzazocine, 1,2,3,4,5,6 - hexahydro - 3 - (2,5-dioxacyclopentylmethyl) - 8 - octanoylamino - cis - 2,6-methano - 3 - benzazocine, 1,2,3,4,5,6 - hexahydro-3-(2,5-dioxacyclopentylmethyl) - 8-cyclopentanecarbonylamino-cis - 6,11 - dimethyl-2,6-methano-3-benzazocine, 1,2,3,4, 5,6 - hexahydro - 3 - (2,5-dioxacyclopentylmethyl)-8-(2-pyridinecarbonylamino) - cis-6,11-dimethyl-2,6-methano-3 - benzazocine, 1,2,3,4,5,6-hexahydro-3-(2,5-dioxacyclopentylmethyl) - 8 - decanesulfonamido-cis-6,11-dimethyl-2,6-methano-3-benzazocine.

EXAMPLE 4

Following a procedure similar to that described above in Example 1A but using when 1,2,3,4,5,6-hexahydro-3 - (2,5 - dioxacyclopentylmethyl)-8-hydroxy-cis-6,11-dimethyl-2,6-methano-3-benzazocine is converted to the sodium salt, i.e. the 8-(Na—O—) compound, by treatment with sodium naphthyl and this product is reacted with chloromethyl methyl ether, there is obtained 1,2,3,4,5,6-hexahydro - 3 - (2,5 - dioxacyclopentylmethyl)-8-methoxymethoxy - cis - 6,11-dimethyl-2,6-methano-3-benzazocine.

EXAMPLE 5

A mixture of 13 g. of 1,2,3,4,5,6-hexahydro-8-hydroxy-cis-6,11-dimethyl-2,6-methano-3-benzazocine, 150 ml. of dimethylformamide, 15 g. of sodium bicarbonate, and 11.5 g. of 2-bromomethyl-2-methyl-1,3-dioxolane was refluxed with stirring for eight hours, then an additional 22 g. of 2-bromomethyl-2-methyl-1,3-dioxolane was added, and the mixture was refluxed for a further period of two hours. The reaction mixture was filtered and the filtrate was concentrated under reduced pressure. The residue thus obtained was partitioned between water and chloroform. The chloroform layer was separated, dried, and concentrated under reduced pressure to yield 19 g. of red-brown oil. This oil was chromatographed on a silica column, eluting with a mixture of 94% chloroform, 3% methyl alcohol, and 3% isopropyl alcohol, by volume. There was thus obtained 13.8 g. of a red-brown oil. When 2.5 g. of this oil was dissolved in acetone and ethereal hydrogen chloride was added, there was obtained 1.4 g. of crystalline solid which melted at 232–235° C. (dec.). When this product was recrystallized from 20 ml. of ethyl alcohol there was obtained 0.4 g. of crystalline solid which melted at 238–241° C. (dec.). This product was 1,2,3,4,5,6 - hexahydro-3-(1-methyl-2,5-dioxacyclopentylmethyl) - 8 - hydroxy - cis - 6,11-dimethyl-2,6-methano-3-benzazocine hydrochloride.

EXAMPLE 6

Following a procedure similar to that described above in Example 5 but using 1,2,3,4,5,6-hexahydro-8-fluoro-cis-6,11-dimethyl-2,6-methano-3-benzazocine instead of 1,2,3,4,5,6 - hexahydro - 8 - hydroxy-cis-6,11-dimethyl-2,6-methano-3-benzazocine, there is obtained 1,2,3,4,5,6-hexahydro - 3 - (1 - methyl-2,5-dioxacyclopentylmethyl)-8-fluoro - cis - 6,11 - dimethyl-2,6-methano-3-benzazocine hydrochloride.

EXAMPLE 7

Following a procedure similar to that described above in Example 5, but using 2-bromomethyl-2-propyl-1,3-dioxolane instead of 2 - bromomethyl - 2-methyldioxolane, there is obtained 1,2,3,4,5,6-hexahydro-3-(1-propyl-2,5-dioxacyclopentylmethyl) - 8 - hydroxy-cis-6,11-dimethyl-2,6-methano-3-benzazocine hydrochloride.

EXAMPLE 8

Following a procedure similar to that described above in Example 5, but using 2-bromomethyl-4-ethyl-1,3-dioxolane instead of 2-bromomethyl-2-methyl-1,3-dioxolane, there is obtained 1,2,3,4,5,6-hexahydro-3-[(1-methyl-3 - ethyl - 2,5 - dioxacyclopentyl)methyl]-8-hydroxy-cis-6,11 - dimethyl - 2,6 - methano-3-benzazocine hydrochloride.

EXAMPLE 9

To a mixture of 21.7 g. of 1,2,3,4,5,6-hexahydro-8-hydroxy - cis - 6,11-dimethyl-2,6-methano-3-benzazocine, 15.0 g. of sodium bicarbonate and 300 ml. of dimethylformamide there was gradually added with stirring 18.6 g. of 2,2-dimethoxyethyl bromide over a period of approximately seven minutes. After this addition was completed the mixture was refluxed for two hours. The reaction mixture was filtered and the solid collected on the filter was washed with ethyl alcohol. The filtrate and wash liquor were combined and concentrated by evaporation under reduced pressure to yield a tan syrup. This syrup was taken up in water and extracted with a warm mixture of ethyl acetate and diethyl ether. The organic extract was washed with water, dried, charcoaled, and filtered. The filtrate was concentrated and the residual product was mixed with hexane. The crystalline solid which separated from the hexane solution was collected on a filter to yield 26.2 g. of off-white solid which melted at 110–112.5° C. A portion of this product was recrystallized from isopropyl acetate-hexane mixture and then from isopropyl acetate to yield 3.3 g. of 1,2,3,4,5,6-hexahydro-3 - (2,2 - dimethoxyethyl)-8-hydroxy-cis-6,11-dimethyl-2,6-methano-3-benzazocine as an off-white crystalline solid which melted at 111.6–114.2° C. (corr.).

EXAMPLE 10

(A) Proceeding in a manner similar to that described above in Example 9, 8.7 g. of 1,2,3,4,5,6-hexahydro-8-hydroxy-trans-6,11 - dimethyl - 2,6 - methano - 3 - benzazocine was interacted with 8.0 g. of 2,2-dimethoxyethyl bromide in the presence of 6.0 g. of sodium bicarbonate and 140 ml. of dimethylformamide to yield 4.6 g. of 1,2,3,4,5,6 - hexahydro - 3 - (2,2 - dimethoxyethyl)-8-hydroxy - trans - 6,11 - dimethyl - 2,6 - methano - 3-benzazocine as a pink crystalline solid which melted at 98.6–103.0° C. (corr.).

(B) When 1,2,3,4,5,6, - hexahydro - 3 - (2,2 - dimethoxyethyl) - 8 - hydroxy - trans - 6,11 - dimethyl - 2,6-methano-3-benzazocine is O-acylated, using in the mixed anhydride procedure described above in Example 1B isovaleric acid, cyclopropanecarboxylic acid, and isonicotinic acid, the respective esters obtained are 1,2,3,4,5,6-hexahydro - 3 - (2,2 - dimethoxyethyl) - 8 - isovaleroxy-trans-6,11-dimethyl-2,6-methano - 3 - benzazocine, 1,2,3,4,5,6 - hexahydro - 3 - (2,2-dimethoxyethyl)-8-cyclopropanecarbonyloxy - trans - 6,11 - dimethyl - 2,6 - methano-3-benzazocine, and 1,2,3,4,5,6 - hexahydro - 3 - (2,2-dimethoxyethyl) - 8 - isonicotinoyloxy - trans - 6,11 - dimethyl-2,6-methano-3-benzazocine.

EXAMPLE 11

Following a procedure similar to that described above in Example 9 but using 1,2,3,4,5,6,-hexahydro-8-hydroxy-cis - (6 - methyl - 11 - ethyl) - 2,6 - methano - 3 - benzazocine instead of 1,2,3,4,5,6 - hexahydro - 8 - hydroxy-cis - 6,11 - dimethyl - 2,6 - methano - 3 - benzazocine, there is obtained 1,2,3,4,5,6 - hexahydro - 3 - (2,2 - dimethoxyethyl) - 8 - hydroxy - cis - (6 - methyl - 11 - ethyl)-2,6 - methano - 3 - benzazocine.

EXAMPLE 12

A mixture of 6.2 g. of 1,2,3,4,5,6,-hexahydro-8-methoxy - cis - 6,11 - dimethyl - 2,6 - methano - 3 - benzazocine hydrochloride, 6.6 g. of sodium bicarbonate, 80 ml. of dimethylformamide, and 4.0 g. of 2,2-dimethoxyethyl bromide was stirred and refluxed for one and three-quarters hours. The reaction mixture was concentrated under reduced pressure and the resulting residue was partitioned between water and diethyl ether. The ether layer was separated, dried, charcoaled, and filtered. The ether was evaporated from the filtrate to yield 6.6 g. of yellow syrup. This syrup was stirred in an ice bath and a solution of 2.5 ml. of concentrated hydrochloric acid in 15 ml. of water was added all at once. The crystalline solid which separated from solution was collected on a filter, washed with diethyl ether, and dried. This product, which weighed 6.4 g., was recrystallized from 35 ml. of diethyl ether-tetrahydrofuran mixture. There was thus obtained 4.6 g. of 1,2,3,4,5,6-hexahydro-3-(2,2-dimethoxyethyl) - 8 - methoxy - cis - 6,11 - dimethyl - 2,6 - methano - 3 - benzazocine hydrochloride as a white crystalline solid which melted at 138.0–140.0° C. (corr.).

EXAMPLE 13

Following a procedure similar to that described above in Example 9 but using 1,2,3,4,5,6-hexahydro-8-acetamido - cis - 6,11 - dimethyl - 2,6 - methano - 3 - benzazocine, 1,2,3,4,5,6 - hexahydro - 8 - bromo - cis - 6,11-dimethyl - 2,6 - methano - 3 - benzazocine, and 1,2,3,4,5,6 - hexahydro - 8 - nitro - cis - 6,11 - dimethyl - 2,6-methano - 3 - benzazocine instead of the corresponding 8-methoxy compound, there are obtained the respective products 1,2,3,4,5,6 - hexahydro - 3 - (2,2 - dimethoxyethyl) - 8 - acetamido - cis - 6,11 - dimethyl-2,6-methano-3-benzazocine, 1,2,3,4,5,6 - hexahydro - 3 - (2,2 - dimethoxyethyl) - 8 - bromo - cis - 6,11 - dimethyl - 2,6-methano - 3 - benzazocine, and 1,2,3,4,5,6-hexahydro-3-(2,2 - dimethoxyethyl) - 8 - nitro - cis - 6,11 - dimethyl-2,6 - methano - 3 - benzazocine.

EXAMPLE 14

(A) A mixture of 21.7 g. of 1,2,3,4,5,6-hexahydro-8-hydroxy - cis - 6,11 - dimethyl - 2,6 - methano - 3 - benzazocine, 12.6 g. of sodium bicarbonate, 150 ml. of dimethylformamide, and 12 ml. of ethyl bromoacetate was stirred and refluxed for five and one-quarter hours. The reaction mixture was filtered and the filtrate was concentrated by evaporation under reduced pressure. The residue thus obtained crystallized. The solid dissolved in water to which a small amount of diethyl ether had been added, but on standing a crystalline solid separated from the solution. This solid was collected on a filter, washed thoroughly with water, and dried at 70° C. There was thus obtained 20.1 g. of a buff-colored solid which melted at 128–130.5° C. This product was recrystallized from 135 ml. of methyl alcohol and 100 ml. of water with charcoaling. There was thus obtained 17.8 g. of 1,2,3,4,5,6-hexahydro-3-(carbethoxymethyl) - 8 - hydroxy - cis-6,11-dimethyl - 2,6 - methano - 3 - benzazocine as an off-white crystalline solid which melted at 128.5–131.0° C. (corr.).

(B) When 1,2,3,4,5,6 - hexahydro - 3 - (carbethoxymethyl) - 8 - hydroxy - cis - 6,11 - dimethyl - 2,6 - methano - 3 - benzazocine is O-acylated, using in the mixed anhydride procedure described above in Example 1B acetic acid, 2,2-dimethylpropanoic acid, cyclobutanecarboxylic acid, and nicotinic acid, the respective acylation products are 1,2,3,4,5,6 - hexahydro - 3 - (carbethoxymethyl) - 8 - acetoxy - cis - 6,11 - dimethyl - 2,6-methano - 3 - benzazocine, 1,2,3,4,5,6 - hexahydro-3-(carbethoxymethyl) - 8 - (2,2 - dimethylpropanoyloxy)-cis - 6,11 - dimethyl - 2,6 - methano - 3 - benzazocine, 1,2,3,4,5,6 - hexahydro - 3 - (carbethoxymethyl) - 8 -cyclobutanecarbonyloxy - cis - 6,11 - dimethyl - 2,6 - methano-3-benzazocine, and 1,2,3,4,5,6 - hexahydro - 3 - (carbethoxymethyl) - 8 - nicotinoyloxy - cis - 6,11 - dimethyl-2,6-methano - 3 - benzazocine.

EXAMPLE 15

Following a procedure similar to that described above in Example 14A, by interacting 1,2,3,4,5,6-hexahydro-8-bromo-cis-6,11-dimethyl - 2,6 - methano-3-benzazocine, 1,2,3,4,5,6 - hexahydro - 8 - nitro-cis-6,11-dimethyl-2,6-methano-3-benzazocine, and 1,2,3,4,5,6 - hexahydro-8-n-butoxy-cis-6-11-dimethyl - 2,6 - methano-3-benzazocine with methyl 4-bromobutyrate there are obtained the respective products 1,2,3,4,5,6 - hexahydro-3-(3-carbomethoxypropyl)-8-bromo-cis-6,11-dimethyl - 2,6 - methano-3-benzazocine, 1,2,3,4,5 ,6 - hexahydro-3-(3-carbomethoxypropyl) - 8 - nitro-cis-6,11-dimethyl - 2,6 - methano-3-benzazocine, and 1,2,3,4,5,6-hexahydro - 3 - (3-carbomethoxypropyl) - 8 - n - butoxy-cis-6,11-dimethyl-2,6-methano-3-benzazocine.

EXAMPLE 16

Following a procedure similar to that described above in Example 14A, by interacting 1,2,3,4,5,6-hexahydro-8-trifluoromethyl - cis - 6,11 - dimethyl - 2,6 - methano-3-benzazocine with n-hexyl 2 - bromohexanoate there is obtained 1,2,3,4,5,6 - hexahydro - 3 - (1 - carbohexoxypentyl) - 8 - trifluoromethyl - cis - 6,11 - dimethyl - 2,6-methano-3-benzazocine.

EXAMPLE 17

Following a procedure similar to that described above in Example 14A, by interacting 1,2,3,4,5,6 - hexahydro-8 - hydroxy - cis - 6 - methyl - 2,6 - methano - 3 - benzazocine with benzyl 3-bromopropionate there is obtained 1,2,3,4,5,6 - hexahydro - 3 - (2 - carbobenzyloxyethyl)-8-hydroxy-cis-6-methyl-2,6-methano-3-benzazocine.

EXAMPLE 18

A mixture of 3.2 g. of 1,2,3,4,5,6 - hexahydro-3-(carbethoxymethyl) - 8 - hydroxy-cis - 6,11 - dimethyl-2,6-methano-3-benzazocine, 10 ml. of concentrated hydrochloric acid, and 10 ml. of water was refluxed for one and one-half hours. The reaction mixture was concentrated under reduced pressure and the syrup thus obtained as a residue was taken up in 25 ml. of glacial acetic acid. To the solution there was added dropwise about 5 ml. of diethyl ether. The solid which separated from solution was collected on a filter and washed with glacial acetic acid and with ethyl alcohol, and dried first at 70° C. and then in vacuo over phosphorus pentoxide and sodium hydroxide at 60° C. There was thus obtained 2.8 g. of 1,2,3,4,5,6-hexahydro - 3 - (carboxymethyl)-8-hydroxy-cis-6,11-dimethyl - 2,6 - methano - 3 - benzazocine hydrochloride as a white crystalline powder which melted at 232.0–235.0° C. (dec.)(corr.).

EXAMPLE 19

Following a procedure similar to that described above in Example 18, by hydrolyzing 1,2,3,4,5,6 - hexahydro-3-(2 - carbobenzyloxyethyl) - 8 - hydroxy - 6 - methyl-2,6-methano - 3 - benzazocine with hydrochloric acid there is obtained 1,2,3,4,5,6 - hexahydro - 3 - (2 - carboxyethyl) - 8 - hydroxy - 6 - methyl - 2,6 - methano-3-benzazocine hydrochloride.

EXAMPLE 20

(A) To a solution of 2.17 g. of 1,2,3,4,5,6-hexahydro-8 - hydroxy - cis - 6,11 - dimethyl - 2,6 - methano-3-benzazocine in 50 ml. of dimethylformamide and 25 ml. of tetrahydrofuran there was added 2.17 g. of sodium bicarbonate, and the resulting mixture was stirred while adding dropwise 2.0 g. of ethyl 4-chloro-2-methylcrotonate in 10 ml. of tetrahydrofuran over a period of 40 minutes. The reaction mixture was then stirred and refluxed for one and three-quarters hours and filtered. The solid collected on a filter was washed with ethyl alcohol and the filtrate and wash liquor were combined and concentrated under reduced pressure to yield a pink liquid residue. This residue was partitioned between diethyl ether and water, and the ether layer was separated and washed with water and concentrated on a steam bath to yield 4.0 g. of yellow syrup. This product was concentrated under reduced pressure to yield 3.40 g. of syrup. Diethyl ether was added to this product which solidified to yield 2.55 g. of white crystals which melted at 130–138° C. This solid was recrystallized from aqueous ethyl alcohol with charcoaling and then from diethyl ether with charcoaling to yield 1.64 g. of 1,2,3,4,5,6-hexahydro - 3 - (trans-3-carbethoxy-2-butenyl) - 8 - hydroxy-cis-6,11-dimethyl-2,6-methano-3-benzazocine as a white crystalline solid which melted at 144.0–146.0° C. (corr.).

(B) When benzyl 4-chloro-2-methylcrotonate is used instead of the ethyl ester in the foregoing procedure the product is 1,2,3,4,5,6-hexahydro-3-(trans-3-carbobenzyloxy-2-butenyl)-cis-6,11-dimethyl - 2,6 - methano-3-benzazocine.

(C) When 1,2,3,4,5,6 - hexahydro - 3 - (trans-3-carbethoxy - 2 - butenyl) - 8 - hydroxy-cis-6,11-dimethyl-2,6-methano-3-benzazocine is O-acylated, using in the mixed anhydride procedure described above in Example 1B acetic acid, isovaleric acid, cyclopropanecarboxylic acid, and nicotinic acid, the respective acylation products are 1,2,3,4,5,6 - hexahydro - 3 - (trans - 3 - carbethoxy-2-butenyl) - 8 - acetoxy-cis-6,11-dimethyl-2,6-methano-3-benzazocine, 1,2,3,4,5,6 - hexahydro-3-(trans-3-carbethoxy - 2 - butenyl) - 8 - isovaleroxy-cis-6,11-dimethyl-2,6-methano - 3 - benzazocine, 1,2,3,4,5,6 - hexahydro-3-(trans - 3 - carbethoxy - 2 - butenyl) - 8 - cyclopropane-carbonyloxy-cis-6,11-dimethyl - 2,6 - methano - 3 - benzazocine, and 1,2,3,4,5,6 - hexahydro-3-(trans-3-carbethoxy - 2 - butenyl) - 8 - nicotinoyloxy-cis-6,11-dimethyl-2,6-methano-3-benzazocine.

(D) Following a procedure similar to that described above in part A of this example, but using 1,2,3,4,5,6-hexahydro - 8 - nitro - cis - 6,11 - dimethyl - 2,6 - methano - 3 - benzazocine, 1,2,3,4,5,6 - hexahydro - 8 - fluoro-cis - 6,11 - dimethyl - 2,6 - methano - 3 - benzazocine, 1,2,3,4,5,6 - hexahydro - 8 - trichloromethoxy - cis - 6,11-dimethyl - 2,6 - methano - 3 - benzazocine, and 1,2,3,4, 5,6 - hexahydro - 8 - trifluoromethyl - cis - 6,11 - dimethyl-2,6 - methano - 3 - benzazocine instead of the corresponding 8-hydroxy compound, the respective products are 1,2,3,4,5,6 - hexahydro - 3 - (trans - 3 - carbethoxy - 2-butenyl) - 8 - nitro - cis - 6,11 - dimethyl - 2,6 - methano-3 - benzazocine, 1,2,3,4,5,6 - hexahydro - 3 - (trans - 3-carbethoxy - 2 - butenyl) - 8 - fluoro - cis - 6,11 - dimethyl-2,6 - methano - 3 - benzazocine, 1,2,3,4,5,6 - hexahydro-3 - (trans - 3 - carbethoxy - 2 - butenyl) - 8 - trichloromethoxy - cis - 6,11 - dimethyl - 2,6 - methano - 3-benzazocine, and 1,2,3,4,5,6 - hexahydro - 3 - (trans - 3-carbethoxy - 2 - butenyl) - 8 - trifluoromethyl - cis - 6,11-dimethyl-2,6-methano-3-benzazocine.

EXAMPLE 21

Following a procedure similar to that described above in Example 20A, by interacting 1,2,3,4,5,6 - hexahydro-8 - chloro - cis - 6,11 - diethyl - 2,6 - methyl - 3-benzazocine with methyl 4-chlorocrotonate there is obtained 1,2,3,4,5,6 - hexahydro - 3 - (trans - 3 - carbomethoxy - 2 - propenyl) - 8 - chloro - cis - 6,11 - diethyl-2,6-methano-3-benzazocine.

EXAMPLE 22

Following a procedure similar to that described above in Example 20A, by interacting 1,2,3,4,5,6 - hexahydro-8 - methanesulfonamido - cis - 6,11 - dimethyl - 2,6-methano - 3 - benzazocine, 1,2,3,4,5,6 - hexahydro - 8-cyclopropanecarbonylamino - cis - 6,11 - dimethyl - 2,6-methano - 3 - benzazocine and 1,2,3,4,5,6 - hexahydro-8 - nicotinoylamino - cis - 6,11 - dimethyl - 2,6 - methano-3 - benzazocine with ethyl 4 - bromo - 2 - ethylcrotonate there are obtained the respective products 1,2,3,4,5,6-hexahydro - 3 - (trans - 3 - carbethoxy - 2 - pentenyl)-8 - methanesulfonamido - cis - 6,11 - dimethyl - 2,6-methano - 3 - benzazocine, 1,2,3,4,5,6 - hexahydro - 3-(trans - 3 - carbethoxy - 2 - pentenyl) - 8 - cyclopropane-carbonylamino - cis - 6,11 - dimethyl - 2,6 - methano-3 - benzazocine, and 1,2,3,4,5,6 - hexahydro - 3 - (trans-3 - carbethoxy - 2 - pentenyl) - 8 - nicotinoylamino - cis-6,11-dimethyl-2,6-methano-3-benzazocine.

EXAMPLE 23

A mixture of 0.8 g. of 1,2,3,4,5,6 - hexahydro - 3-(trans - 3 - carbethoxy - 2 - butenyl) - 8 - hydroxy - cis-6,11 - dimethyl - 2,6 - methano - 3 - benzazocine and 8.0 ml. of concentrated hydrochloric acid was refluxed for one and one-third hours. The reaction mixture was concentrated under reduced pressure. The resulting residue was dissolved in isopropyl alcohol and the solution was filtered. Diethyl ether was added to the filtrate and the solid which precipitated was collected on a filter. This product was recrystallized twice from isopropyl alcohol and then from acetone to yield 0.25 g. of 1,2,3,4,5,6-hexahydro - 3 - (trans - 3 - carboxy - 2 - butenyl) - 8-hydroxy - cis - 6,11 - dimethyl - 2,6 - methano - 3-benzazocine hydrochloride as a white crystalline solid which melted at 236.0–241–0° C. (dec.)(corr.).

EXAMPLE 24

Following a procedure similar to that described above in Example 23, by hydrolyzing 1,2,3,4,5,6 - hexahydro-3 - (trans - 3 - carbomethoxy - 2 - propenyl) - 8 - chloro-cis - 6,11 - dimethyl - 2,6 - methano - 3 - benzazocine with hydrochloric acid there is obtained 1,2,3,4,5,6 - hexahydro - 3 - (trans - 3 - carboxy - 2 - propenyl) - 8 - chloro-cis - 6,11 - dimethyl - 2,6 - methano - 3 - benzazocine hydrochloride.

EXAMPLE 25

(A) A mixture of 4.3 g. of 1,2,3,4,5,6 - hexahydro - 8-hydroxy -cis - 6,11 - dimethyl - 2,6 - methano - 3-benzazocine, 2.8 g. of 1 - chloro - 3 - methyl - 2 - butanone, 1.8 g. of sodium bicarbonate, and 40 ml. of dimethylformamide was stirred and refluxed for three and one-half hours. The reaction mixture was filtered and the filtrate was concentrated under reduced pressure to yield 7.2 g. of an oil. This product was chromatographed on silica gel, developing with a mixture of chloroform, methyl alcohol, and isopropylamine (94:3:3 by volume) to yield six 60 ml. fractions which contained 1.4 g., 0.9 g., 0.8 g., 0.3 g., 0.3 g., and 0.5 g. of solid, respectively. The first three fractions (3.1 g. of solid) were combined and recrystallized first from ethyl acetate and then from ethyl alcohol to yield 0.3 g. of 1,2,3,4,5,6-hexahydro - 3 - isobutyrylmethyl - 8 - hydroxy - cis - 6,11-dimethyl - 2,6 - methano - 3 - benzazocine as a pale pink powder which melted at 130.8–137.0° C. (corr.).

(B) When 1,2,3,4,5,6 - hexahydro - 3 - isobutyryl-methyl - 8 - hydroxy - cis - 6,11 - dimethyl - 2,6 - methano - 3 - benzazocine is O-acylated, using in the mixed anhydride procedure described above in Example 1–B heptanoic acid, cyclohexanecarboxylic acid, and isonicotinic acid, the respective acylation products are 1,2,3,4, 5,6 - hexahydro - 3 - isobutyrylmethyl - 8 - heptanoyloxy-cis - 6,11 - dimethyl - 2,6 - methano - 3 - benzazocine, 1,2,3,4,5,6 - hexahydro - 3 - isobutyrylmethyl - 8 - cyclohexanecarbonyloxy - cis - 6,11 - dimethyl - 2,6 - methano-3 - benzazocine, and 1,2,3,4,5,6 - hexahydro - 3 -isobutyrylmethyl - 8 - isonicotinoyloxy - cis - 6,11 - dimethyl-2,6-methano-3-benzazocine.

(C) Following a procedure similar to that described above in part A of this example but using 1,2,3,4,5,6-hexahydro - 8 - nitro - cis - 6,11 - dimethyl - 2,6 - methano - 3 - benzazocine, 1,2,3,4,5,6 - hexahydro - 8 - fluoro-cis - 6,11 - diethyl - 2,6 - methano - 3 - benzazocine, 1,2,3,4,5,6 - hexahydro - 8 - methoxy - cis - (6 - ethyl-11 - methyl) - 2,6 - methano - 3 - benzazocine, and 1,2,3, 4,5,6 - hexahydro - 8 - trifluoromethoxy - cis - 6,11 - dimethyl - 2,6 - methano - 3 - benzazocine instead of 1,2,3,4,5,6 - hexahydro - 8 - hydroxy - cis - 6,11 - dimethyl - 2,6 - methano - 3 - benzazocine, there are obtained the respective products 1,2,3,4,5,6 - hexahydro-3 - isobutyrylmethyl - 8 - nitro - cis - 6,11 - dimethyl - 2,6-methano - 3 - benzazocine, 1,2,3,4,5,6 - hexahydro - 3-isobutyrylmethyl - 8 - fluoro - cis - 6,11 - diethyl - 2,6-methano - 3 - benzazocine, 1,2,3,4,5,6 - hexahydro - 8-methoxy - cis - (6 - ethyl - 11 - methyl) - 2,6 - methano-3 - benzazocine, and 1,2,3,4,5,6 - hexahydro - 3 - isobutyrylmethyl - 8 - trifluoromethoxy - cis - 6,11 - dimethyl-2,6-methano-3-benzazocine.

EXAMPLE 26

Following a procedure similar to that described above in Example 25A but using 1,2,3,4,5,6 - hexahydro - 8-butyramido - cis - 6,11 - dimethyl - 2,6- - methano - 3-benzazocine instead of 1,2,3,4,5,6 - hexahydro - 8 - hydroxy - cis - 6,11 - dimethyl - 2,6 - methano - 3 - benzazocine, there is obtained 1,2,3,4,5,6 - hexahydro - 3 - isobutyrylmethyl - 8 - butyramido - cis - 6,11 - dimethyl-2,6-methano-3-benzazocine.

EXAMPLE 27

Following a procedure similar to that described above in Example 25A, by interacting 1,2,3,4,5,6 - hexahydro-8 - hydroxy - cis - (6 - n - butyl - 11 - methyl) - 2,6-methano - 3 - benzazocine with 1 - chloro - 2 - propanone there is obtained 1,2,3,4,5,6 - hexahydro - 3 - acetylmethyl - 8 - hydroxy - cis - (6 - n - butyl - 11 - methyl)-2,6-methano-3-benzazocine.

EXAMPLE 28

A mixture of 10.8 g. of 1,2,3,4,5,6 - hexahydro - 8-hydroxy - cis - 6,11 - dimethyl - 2,6 - methano - 3 - benzazocine, 3.8 g. of methyl vinyl ketone and 150 ml. of pyridine was heated on a steam bath for one hour. The reaction mixture was concentrated under reduced pressure and the syrup obtained as a residue was crystallized first from ethyl acetate, then from ethyl alcohol, and finally from isopropyl alcohol. There was thus obtained 2.6 g. of 1,2,3,4,5,6 - hexahydro - 3 - (3 - oxobutyl)-8-hydroxy - cis - 6,11 - dimethyl - 2,6 - methano - 3 - benzazocine which melted at 142–145° C.

EXAMPLE 29

Following a procedure similar to that described above in Example 28 but using 1,2,3,4,5,6 - hexahydro - 8 - chloro - cis - 6,11 - dimethyl - 2,6 - methano - 3 - benzazocine instead of 1,2,3,4,5,6 - hexahydro - 8 - hydroxy - cis - 6,11-dimethyl - 2,6 - methano - 3 - benzazocine, there is obtained 1,2,3,4,5,6 - hexahydro - 3 - (3 - oxobutyl) - 8-chloro - cis - 6,11 - dimethyl - 2,6 - methano - 3 - benzazocine.

EXAMPLE 30

(A) A mixture of 23.1 g. of 1,2,3,4,5,6 - hexahydro-8 - hydroxy - cis - 6,11 - dimethyl - 2,6 - methano - 3-benzazocine, 7.5 g. of methyl vinyl ketone, and 300 ml. of pyridine was warmed on a steam bath for one and one-half hours. The reaction mixture was concentrated under reduced pressure and the resulting crystalline residue was recrystallized from methyl alcohol with charcoaling to yield 24.5 g. of buff-colored solid. This product was recrystallized from a mixture of 100 ml. of water and 400 ml. of methyl alcohol. There was thus obtained 17.3 g. of 1,2,3,4,5,6 - hexahydro - 3 - (3 - oxobutyl)-cis - (6 - ethyl - 11 - methyl) - 2,6 - methano - 3 - benzazocine as a pale buff-colored crystalline solid which melted at 158–159° C. (dec.) (corr.).

(B) By interacting 1,2,3,4,5,6 - hexahydro - 3 - (trans-4 - hydroxy - 3 - methyl - 2 - butenyl) - 8 - hydroxy-6,11 - dimethyl - 2,6 - methano - 3- benzazocine with two molecular proportions of acetic anhydride in the presence of pyridine there was obtained 1,2,3,4,5,6 - hexahydro - 3 - (trans - 4 - acetoxy - 3 - methyl - 2 - butenyl)-8 - acetoxy - cis - 6,11 - dimethyl - 2,6 - methano - 3-benzazocine. Treatment of this diester with ammonia in butyl alcohol yields 1,2,3,4,5,6 - hexahydro - 3 -(trans-4 - acetoxy - 3 - methyl - 2 - butenyl) - 8 - hydroxy-cis-6,11-dimethyl-2,6-methano-3-benzazocine.

EXAMPLE 31

(A) A solution of 8.6 g. of 1,2,3,4,5,6 - hexahydro-3-(trans - 3 - carbethoxy - 2 - butenyl) - cis - 6,11 - dimethyl - 8 - hydroxy - 2,6 - methano - 3 - benzazocine in 60 ml. of tetrahydrofuran was gradually added over a period of ten minutes to 2.0 g. of lithium aluminum hydride in 60 ml. of tetrahydrofuran cooled in a cold water bath. The reaction mixture was stirred for four hours and then tetrahydrofuran containing 4 ml. of water was added with stirring. The mixture was filtered, the collected solid was extracted with tetrahydrofuran, and the filtrates were combined and concentrated under reduced pressure to yield 7.0 g. of crude 1,2,3,4,5,6 - hexahydro - 3 - (4 - hydroxy - 3 - methyl - 2 - butenyl) - 8 - hydroxy - 6,11 - dimethyl - 2,6 - methano - 3 - benzazocine as a yellow-tan syrup. By triturating 3.3 g. of this syrup in ethyl acetate there was obtained a crystalline solid. This product was recrystallized from ethyl acetate to yield 0.5 g. of 1,2,3,4,5,6 - hexahydro - 3 - (trans - 4 - hydroxy-3 - methyl - 2 - butenyl) - cis - 6,11 - dimethyl - 2,6-methano - 3 - benzazocine as an off-white crystalline solid which melted at 158–162° C.

EXAMPLE 32

Following a procedure similar to that described above in Example 31 but using 1,2,3,4,5,6-hexahydro-3-(trans-carbomethoxy - 2 - propenyl) - 8 - chloro - cis - 6,11 - dimethyl - 2,6 - methano - 3 - benzazocine instead of methyl-1,6-methano-3-benzazocine instead of 1,2,3,4,5,6-hexahydro - 3 - (trans - 3 - carbethoxy - 2 - butenyl) - 8-hydroxy - cis - 6,11 - dimethyl - 2,6 - methano - 3 - benzazocine, there is obtained 1,2,3,4,5,6-hexahydro-3-(trans-4 - hydroxy - 2 - butenyl) - 8 - chloro - cis - 6,11 - dimethyl-2,6-methano-3-benzazocine.

EXAMPLE 33

To a stirred mixture of 7.3 g. of magnesium turnings and 50 ml. of diethyl ether there was added dropwise a solution of 18 ml. of methyl iodide in 200 ml. of diethyl ether. The resulting mixture was stirred for ten minutes and then there was added dropwise a solution of 8.7 g. of 1,2,3,4,5,6 - hexahydro - 3 - (3 - oxobutyl) - 8 - hydroxy-cis-6,11-dimethyl-2,6-methano-3-benzazocine in 100 ml. of tetrahydrofuran. The reaction mixture was stirred for three hours and then a solution of 10 g. of ammonium chloride in 30 ml. of water was dripped into the mixture. Diethyl ether was decanted from the solid in the mixture, and the solid was extracted with warm tetrahydrofuran. The tetrahydrofuran solution was concentrated under reduced pressure and the solid residue was recrystallized from ethyl alcohol to yield 5.2 g. of off-white solid which melted at 197–200° C. dec.). This product was recrystallized from methyl alcohol to yield 1.7 g. of off-white solid which melted at 234–235° C. (dec.). This solid was partitioned between diethyl ether and concentrated ammonium hydroxide. The ether layer was separated, dried, and concentrated under reduced pressure to yield a syrup. This product was crystallized from ethyl alcohol, thus yielding 0.6 g. of 1,2,3,4,5,6-hexahydro-3-(3-hydroxy-3-methylbutyl)-8-hydroxy-cis-6,11-dimethyl-3-benzazocine as a white powder which melted at 157.0–159.0° C. (corr.).

EXAMPLE 34

A solution of 10.85 g. of 1,2,3,4,5,6-hexahydro-8-hydroxy-cis-6,11-dimethyl-2,6 - methano - 3 - benzazocine in 1000 ml. of tetrahydrofuran was dripped into a stirred mixture of 6.0 g. of citraconic anhydride and 100 ml. of tetrahydrofuran during a period of ten minutes. The reaction mixture was then stirred for three hours, concentrated by evaporation under reduced pressure to a volume of about 100 ml., and chilled. The crystalline solid which separated from solution was collected on a filter, washed with ethyl alcohol, and dried at 70° C. There was thus obtained 10.33 g. of 1,2,3,4,5,6-hexahydro-3-(cis-3-carboxy - 2 - butenoyl) - 8 - hydroxy - cis - 6,11 - dimethyl-2,6-methano-3-benzazocine as a white crystalline powder which melted at 214–215° C. (dec.).

(B) By reducing 1,2,3,4,5,6-hexahydro-3-(cis-3-carboxy - 2 - butenoyl) - 8 - hydroxy - cis - 6,11 - dimethyl-2,6-methano-3-benzazocine with aluminum hydride there is obtained 1,2,3,4,5,6-hexahydro-3-(cis-4-hydroxy-3-methyl-2-butenyl)-cis-6,11-dimethyl-2,6-methano - 3 - benzazocine.

EXAMPLE 35

Reduction of 1,2,3,4,5,6-hexahydro-3-(3-methyl-2-oxobutyl) - 8 - hydroxy - cis - 6,11 - dimethyl - 2,6 - methano-3-benzazocine with sodium borohydride yields 1,2,3,4,5,6- hexahydro-3-(2-hydroxy-3-methylbutyl)-8-hydroxy-cis-6,11-dimethyl-2,6-methano-3-benzazocine.

EXAMPLE 36

Following a procedure similar to that described above in Example 20A, by interacting 1,2,3,4,5,6-hexahydro-8-methanesulfonamido-cis-6,11-dimethyl-2,6-methano-3-benzazocine with 4-chloro-2-methylcrotonate there is obtained 1,2,3,4,5,6-hexahydro-3-(trans-3-carbethoxy-2-butenyl)-8-methanesulfonamido-cis-6,11-dimethyl-2,6-methano-3-benzazocine.

The 1,2,3,4,5,6-hexahydro-8-methanesulfonamido-cis-6,11-dimethyl-2,6-methano-3-benzazocine starting material is obtained as follows. 1,2,3,4,5,6-hexahydro-3-methyl-8-nitro-cis-6,11-dimethyl-2,6-methano-3-benzazocine is N-demethylated in conventional manner by treatment with cyanogen bromide to form the 3-cyano compound which by heating with dilute hydrochloric acid is converted to the nor-base, 1,2,3,4,5,6-hexahydro-8-nitro-cis-6,11-dimethyl-2,6-methano-3-benzazocine. Reduction of this product by treatment with zinc and acetic acid yields 1,2,3,4,5,6-hexahydro-8-amino-cis-6,11-dimethyl-2,6-methano-3-benzazocine. This base is converted to the mono-hydrochloride by treatment with one equivalent of hydrochloric acid. Treatment of this base mono-hydrochloride with methanesulfonyl chloride yields the desired 1,2,3,4,5,6-hexahydro-8-methanesulfonamido-cis-6,11-dimethyl-2,6-methano-3-benzazocine. Other desired 8-(N-acylamino) starting materials for use in the practice of this invention are obtained in similar fashion.

EXAMPLE 37

Following a procedure similar to that described above in Example 20A but using 1,2,3,4,5,6-hexahydro-8-nitro-cis-6,11-dimethyl-2,6-methano-3-benzazocine instead of 1,2,3,4,5,6-hexahydro-8-hydroxy-cis-6,11-dimethyl-2,6-methano-3-benzazocine, there is obtained 1,2,3,4,5,6-hexahydro-3-(trans-3-carbethoxy-2-butenyl)-8-nitro-cis-6,11-dimethyl-2,6-methano-3-benzazocine. Reduction of this product with lithium aluminum hydride, using a procedure similar to that described above in Example 31A, yields 1,2,3,4,5,6-hexahydro-3-(trans-4-hydroxy-3-methyl-2-butenyl)-8-nitro-cis-6,11-dimethyl-2,6-methano-3-benzazocine. Reduction of this product with zinc and acetic acid yields 1,2,3,4,5,6-hexahydro-3-(trans-4-hydroxy-3-methyl-2-butenyl)-8-amino-cis-6,11-dimethyl-2,6-methano-3-benzazocine.

EXAMPLE 38

Following a procedure similar to that described above in Example 36, but using 1,2,3,4,5,6-hexahydro-8-dodecanesulfonamido-cis-6,11-dimethyl-2,6-methano-3-benzazocine instead of the corresponding 8-methanesulfonamido compound there is obtained 1,2,3,4,5,6-hexahydro-3-(trans-3-carbethoxy-2-butenyl)-8-dodecanesulfonamido-cis-6,11-dimethyl-2,6-methano-3-benzazocine.

As indicated hereinabove, the 1,2,3,4,5,6-hexahydro-3-($Y^1$)-8-($Y^2$)-6-($R^1$)-11-($R^2$)-2,6-methano-3-benzazocines of this invention are useful as antagonists of strong analgesic agents such as meperidine and morphine. Thus, when tested in rats by a modified D'Amour-Smith thermal stimulus test procedure, the compounds of Formula I were found to be antagonists of the analgesic activity of morphine and meperidine. In this test procedure, when the compounds of Formula I were administered prior to or simultaneously with administration of morphine or meperidine, the expected analgesic effect of the latter was decreased with increasing dosage levels of the former to a point where no analgesic effect was obtained. And when the new compounds were administered after the administration of morphine or meperidine, the analgesic effect was diminished or terminated, depending on the dosage levels involved. For example representative compounds of this invention, each in the form of an aqueous solution of the lactic acid acid-addition salt, were administered subcutaneously to rats to determine the dosage level, in terms of weight of antagonist per kilogram of body weight of the animal, which caused reduction of the analgesic effect of a 60 mg./kg. dose of meperidine hydrochloride by approximately 50 percent or 15 mg./kg. dose of morphine sulfate, so that the analgesic effect produced by the combination of the antagonist and the meperidine hydrochloride or the morphine sulfate was substantially the same as the analgesic effect produced by a 30 mg./kg. dose of meperidine hydrochloride alone or 7.5 mg./kg. of morphine sulfate alone, respectively. Representative test results thus obtained were as follows:

| Compound of Example No. | Mg./kg. versus meperidine |
|---|---|
| 5 | 70 |
| 14A | 66 |
| 18 | 20 |
| 23 | 11 |
| 25A | 2.75 |
| 28 | 1.7 |
| 30 | 20 |
| 31A | 80 |
| 34A | 10 |

We claim:

1. 1,2,3,4,5,6-hexahydro-3-($Y^1$)-8-($Y^2$)-6-($R^1$)-11-($R^2$)-2,6-methano-3-benzazocine wherein: $R^1$ is alkyl containing 1–4 carbon atoms; $R^2$ is hydrogen or alkyl containing 1–4 carbon atoms; $Y^1$ is (1,3-dioxacycloalkyl)-alkyl containing 4–8 carbon atoms of which 3–4 carbon atoms are in the ring, gem-dialkoxyalkyl containing 4–8 carbon atoms, RO—CO—Z— wherein R is hydrogen, alkyl containing 1–6 carbon atoms, or benzyl, and Z is alkylene containing 1–5 carbon atoms, or $$RO—CO-alkylene-CH(R^3)—$$

wherein alkenylene contains 2–5 carbon atoms, R has the same significance indicated above, and $R^3$ is hydrogen, methyl, or ethyl; and $Y^2$ is halo, hydroxy, alkoxy containing 1–4 carbon atoms, methoxymethoxy, alkanoyloxy containing 1–12 carbon atoms, cycloalkanecarbonyloxy containing 4–8 carbon atoms, pyridinecarbonyloxy, nitro, or amino.

2. A compound according to claim 1 wherein $R^1$ and $R^2$ are each alkyl.

3. A compound according to claim 2 wherein $Y^1$ is (1,3-dioxacycloalkyl)alkyl.

4. A compound according to claim 2 wherein $Y^1$ is gem-dialkoxyalkyl.

5. A compound according to claim 2 wherein $Y^1$ is RO—CO—Z—.

6. A compound according to claim 2 wherein $Y^1$ is RO—CO-alkenylene-CH($R^3$)—.

7. A compound according to claim 3 wherein $Y^2$ is hydroxy.

8. A compound according to claim 4 wherein $Y^2$ is hydroxy.

9. A compound according to claim 5 wherein $Y^2$ is hydroxy.

10. A compound according to claim 6 wherein $Y^2$ is hydroxy.

11. A compound according to claim 7 wherein $R^1$ and $R^2$ are each methyl and $Y^1$ is 2,5-dioxacyclopentylmethyl.

12. A compound according to claim 8 wherein $R^1$ and $R^2$ are each methyl and $Y^1$ is 2,2-dimethoxyethyl.

13. A compound according to claim 9 wherein $R^1$ and $R^2$ are each methyl and $Y^1$ is RO—CO—CH$_2$—.

14. A compound according to claim 10 wherein $R^1$ and $R^2$ are each methyl and $Y^1$ is $$RO—CO—C(CH_3)=CH—CH_2—$$

15. A compound according to claim 2 wherein $Y^2$ is alkoxy.

16. A compound according to claim 2 wherein $Y^2$ is halo.

17. 1,2,3,4,5,6-hexahydro-3-(cis - 3 - carboxy - 2 - butenoyl) - 8 - hydroxy - cis - 6,11 - dimethyl-2,6-methano-3-benzazocine.

References Cited
UNITED STATES PATENTS

| | | | |
|---|---|---|---|
| 3,320,265 | 5/1967 | Clarke | 260—294.7 |
| 3,341,538 | 9/1967 | Block et al. | 260—247.2 |
| 3,417,094 | 12/1968 | Dexter | 260—294.7 |

FOREIGN PATENTS

| | | | |
|---|---|---|---|
| 6412959 | 5/1965 | Netherlands | 260—293 |

HENRY R. JILES, Primary Examiner

G. T. TODD, Assistant Examiner

U.S. Cl. X.R.

260—239.1, 239.5, 258, 284, 292, 293 A, 293.4 A, 293.4 C, 294 A, 294 S, 294.3 A, 294.3 E, 294.7 B, DIG. 13; 424—232, 241, 245, 254, 259, 267